(12) United States Patent
George

(10) Patent No.: US 9,396,555 B2
(45) Date of Patent: Jul. 19, 2016

(54) REFERENCE BASED SIZING

(71) Applicant: Robert George, Gibsonia, PA (US)

(72) Inventor: Robert George, Gibsonia, PA (US)

( * ) Notice: Subject to any disclaimer, the term of this patent is extended or adjusted under 35 U.S.C. 154(b) by 0 days.

(21) Appl. No.: 14/847,189

(22) Filed: Sep. 8, 2015

(65) Prior Publication Data

US 2016/0104299 A1    Apr. 14, 2016

Related U.S. Application Data

(60) Provisional application No. 62/061,324, filed on Oct. 8, 2014.

(51) Int. Cl.
| | |
|---|---|
| G06K 9/48 | (2006.01) |
| G06T 7/60 | (2006.01) |
| G06T 5/00 | (2006.01) |
| G06K 9/62 | (2006.01) |

(52) U.S. Cl.
CPC .............. *G06T 7/602* (2013.01); *G06K 9/6202* (2013.01); *G06T 5/002* (2013.01); *G06T 2207/10004* (2013.01)

(58) Field of Classification Search
None
See application file for complete search history.

(56) References Cited

U.S. PATENT DOCUMENTS

| | | |
|---|---|---|
| 7,818,399 B1 | 10/2010 | Ross, Jr. et al. |
| 9,055,276 B2 | 6/2015 | Parulski |
| 9,087,354 B1 | 7/2015 | Hambir |
| 9,210,385 B2 * | 12/2015 | Huang ................... H04N 7/181 |
| 2011/0218814 A1 * | 9/2011 | Coats ...................... G06Q 50/22 705/2 |
| 2014/0300722 A1 | 10/2014 | Garcia |

FOREIGN PATENT DOCUMENTS

WO    WO2013/059599    4/2013

OTHER PUBLICATIONS

International Search Report and Written Opinion mailed Jan. 14, 2016 for International Application No. PCT/US2015/54184 filed on Oct. 6, 2015 by Robert George, 7 pages.

* cited by examiner

*Primary Examiner* — Mark Roz
(74) *Attorney, Agent, or Firm* — Cesari and McKenna, LLP

(57) ABSTRACT

Techniques for determining the dimensions of an object. The user of a smartphone snaps a digital photograph which includes both a reference item and the object. A processor then determines the object dimensions by analyzing the digital photo to determine the boundaries of the object and the reference item. From this boundary information, the dimensions of the object can be estimated without further interaction from the user. In optional aspects, the object boundaries can be used to identify the type of object against a database of objects. The object type may be taken into account when presenting the measured dimensions. For example, in a case where the object is recognized as being a pair of women's slacks, the resulting dimensions may be presented as a list of typical dimensions for such a garment including waist, hips, front rise, inseam, leg opening, etc.

9 Claims, 19 Drawing Sheets

| SHAPE TEMPLATES 155 |
|---|
| WOMEN'S JEANS |
| WOMEN'S BLOUSE |
| MEN'S JEANS |

FIG. 3A

| | MFR/VENDOR | SKU | GARMENT TYPE | NORMAL SIZE | DIMENSIONS |
|---|---|---|---|---|---|
| 310 | EXPRESS | ABC23 | WOMEN'S JEAN | 8 | INSEAM, WAIST, HIPS, RISE, OPENING<br>A A A A A |
| | ••• | ••• | ••• | ••• | |
| 312 | LEVI'S 501 | 174B6 | WOMEN'S JEAN | 8 | INSEAM, WAIST, HIPS, RISE, OPENING<br>X X X X X |
| 314 | CALVIN KLEIN | CK123 | WOMEN'S JEAN | 7 | INSEAM, WAIST, HIPS, RISE<br>Y Y Y Y |
| | ••• | ••• | ••• | ••• | |
| 322 | LEVI'S | 374H5 | MEN'S JEAN | 34/30 | INSEAM, WAIST |
| | ••• | ••• | ••• | ••• | |
| 324 | LAND'S END | 13742 | WOMEN JACKET - "RUFFLE PLACKET" | 6 | SLEEVE, CHEST, WAIST, HIPS, NECK, BODY LENGTH |

FIG. 3B

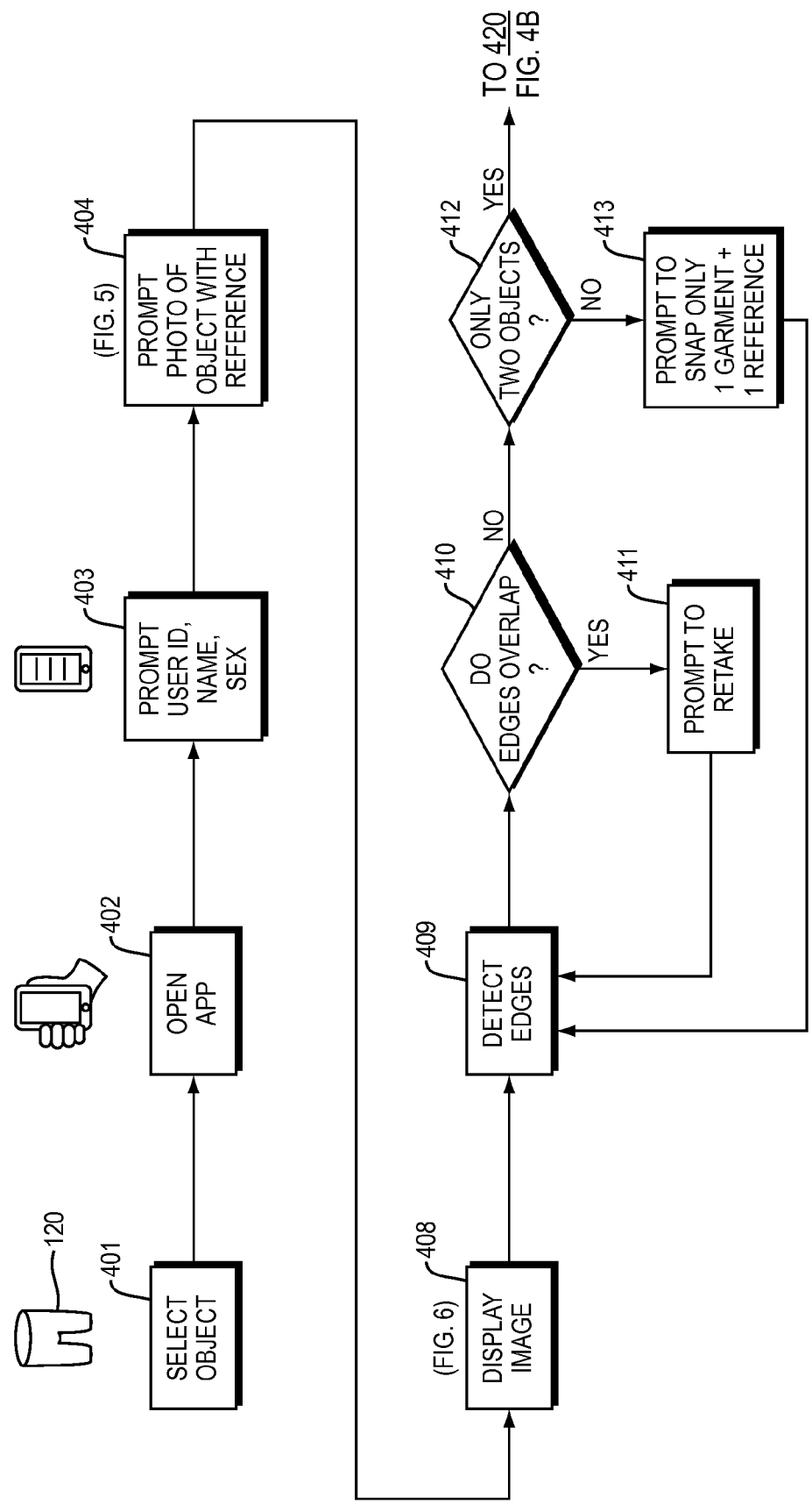

REFERENCE BASED SIZING

CROSS REFERENCE TO RELATED APPLICATION

This application claims the benefit of a co-pending U.S. Provisional Patent Application Ser. No. 62/061,324 filed Oct. 8, 2014 entitled "Reference Based Sizing". The entire contents of that patent application are hereby incorporated by reference herein.

BACKGROUND

1. Technical Field

This patent application relates to techniques for measuring dimensions of an object, and more particularly to using a mobile device to capture a digital image of an object (such as a garment), to determine its dimensions from the image, and to further identify aspects of a specific object from those dimensions.

2. Background

Many different situations call for the accurate measurement of objects. However it is not always convenient to use common tools such as a ruler or tape measure to make a direct measurement of the object. The object may be larger than the available ruler. In other situations, the object and the persons needing access to the dimensions may not be located in the same place.

Certain techniques are known for measuring objects using smartphones. For example, Kamen's RulerPhone app provides a mobile-phone based tool for the measurement of one-dimensional lengths using images acquired by the user.

PCT Application Number WO2013/059599 describes user interaction with an acquired image to determine the size of an object.

SUMMARY

In the method and system described herein, a user begins by placing a reference item near an object to be measured and/or identified. The reference item is a common item of known dimensions, such as a credit card, business card, paper money or coin, etc. The user then takes a smartphone or tablet and snaps a digital photograph which includes both the reference item and the object. A processor, which may be in the smartphone, then determines the object dimensions by analyzing the digital image to determine the boundaries of the object and the reference item. From this boundary information, the dimensions of the object can be estimated without further interaction from the user.

The object may have an irregular shape with specially expected dimensions such as a garment. In this environment, the shape of the object boundaries can be used to identify the type of garment against a database of garment shapes and their expected measurement types and proportions. The garment type may be taken into account when selecting the dimensions to be further considered. For example, in a case where the object is recognized as being a pair of women's slacks, the resulting dimensions may be presented as a list of typical dimensions for such a garment including waist, hips, front rise, inseam, leg opening, etc.

In still other aspects, the digital photograph of the object and the reference item may be corrected for distortion such as that caused when an image plane of the smartphone camera is not perfectly aligned with a front face of the object.

The identified object and its dimensions derived as from the digital image may be used to then further assist with other actions. In one example, the now identified object and its dimensions can be matched against a database to search for similar objects but made by other manufacturers.

BRIEF DESCRIPTION OF THE DRAWINGS

FIG. 3A is an example list of object type templates.

FIG. 3B is an example table of information maintained for different specific objects.

FIG. 4A-4C show a flowchart of a method for identifying the type of object (such as a garment type) and its dimensions from a digital image taken with the mobile device and optional steps such as identifying closely matching objects.

DETAILED DESCRIPTION OF EMBODIMENTS

Introduction

Figure 1:
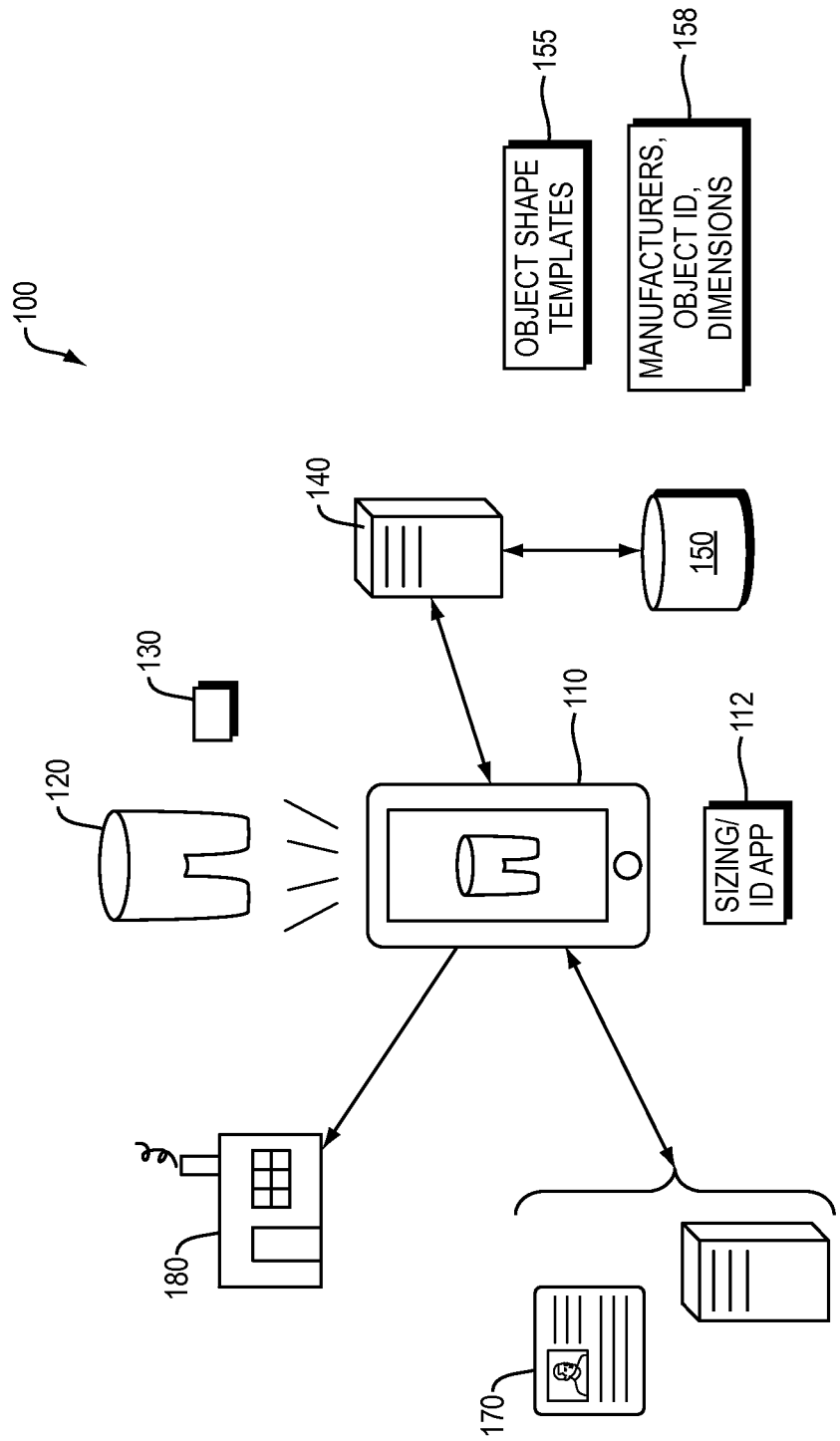
FIG. 1 is a schematic diagram of a system that identifies an object and its dimensions using a mobile device.

A typical environment for various implementations of the techniques described herein will include a mobile device (which could be a smartphone such as an Apple iPhone™, Google Andriod™ or Windows Mobile™ compatible device, or tablet such as an Apple iPad™, Microsoft Surface™). The mobile device will have a processor, memory for programs and data, camera, and wireless communication interface(s). The mobile device is capable of running an application program to share data and programs with a remote server.

In general a person uses the mobile device to snap a digital photograph of the item to be measured and a reference object. The smartphone application and/or server then operates on the pixel data in the digital photograph in the manners described below to recognize the object shape and determine its dimensions.

This description will now review a few example use cases before a detailed discussion of a method and system to implement them in more detail.

Example Use Cases

Example 1

Standard Clothing Item

The Problem: Today's clothing manufacturers have each developed their own guidelines for sizing clothing garments. For this reason, a single type of garment (i.e.: jeans, blazer, skirt, etc.) of the same numerical size, will have different dimensions (i.e.: a size 7 pair of slim fit jeans from Calvin Klein™ will measure differently in the waist, hips, rise (measurement from button to crotch), and thighs, than a size 7 pair of slim fit jeans from Express™, and so on. With no standard measurement guidelines across the industry, it is nearly impossible to find any two manufacturers' clothing items of the same type, style, and size marking (i.e.: small, medium, large, x-large) will have the same dimensions. These sizing differentials make it very difficult for consumers to order clothing from online merchants or even at a retail store without the ability to try them on before purchasing. Existing solutions for identifying consumer sizes involve measuring the dimensions of the consumer but do not address consumer preference in regards to garment fit (i.e.: tight, relaxed, loose). For this reason, body dimensions will only suggest what clothing items should measure for a skin-tight fit, assuming the consumer measures accurately and does not mind the hassle involved.

The Solution: By identifying the dimensions of the clothing garment selected by the user (as opposed to the user him/herself), the user can confirm that an item will fit and will fit based on his/her fit preferences. Additionally, based on the dimensions identified, a database of clothing manufacturers and corresponding size guidelines with measurements, by type, can be searched to identify what size marking should be sought after for each available clothing manufacturer for a specific type of garment.

Example 2

Skewed Clothing Item

The Problem: Ideally an image of the item and reference object are captured with the camera lens being at exactly a 90° angle (perfectly perpendicular) to the item to be measured and reference object. Any variance in angle, regardless of how small, will result in inaccurate measurement calculations, defeating the purpose of the invention regardless of how the user may decide to utilize the measurements being obtained.

The Solution: By identifying the reference item, and acknowledging that based on the top, bottom, and sides of the reference item, the image distortion can be identified. The mobile application can place a visual grid over the image matching the distortion caused by the angle at which the image was captured. Image correction software can then be utilized to straighten both the grid and image removing the need for a user to ensure a perfect angle when capturing an image.

Example 3

Other Standard Objects

The Problem: The need to know measurements of an item is not restricted to clothing. For example, when shopping to replace an existing appliance, to ensure the new unit will fit in the place provided, the dimensions of the existing unit should be known, but a measuring tape is not always available. The same can be said when shopping for the replacement unit.

The Solution: By identifying the dimensions of the new or existing unit, the user can identify the size of the existing item or confirm the size of potential replacement. Additionally, based on the shape and dimensions identified by the invention, a database of similar object manufacturers with measurements similar measurements can be searched to identify what makes and models are available that meet a user's size requirements.

Description of an Example System and Method

FIG. 1 is a high-level schematic diagram of an environment in which systems and corresponding methods for determining the identity of an object may be utilized. The example system 100 includes a mobile device 110, on which runs a object-sizing-identifier (object ID) mobile application 112 (hereafter called the "app"). A user makes use of the mobile device 110 running the app 112 to take a digital image of an object 120 to be identified. The digital image taken also includes an image of a reference object 130. The app 112 process the image to extract certain features such as to detect the edges of the object 120 and the edges of the reference object 130.

These extracted features are then submitted to template matching and database quer(ies). The queries may be submitted to a server 140 which accesses a database 150. The queries may match the edges of detected object(s) against a set of object shape templates 155 to identify an object type. Another query may use the dimension information calculated from the edges in digital image to search for objects that are similar to object 120. The results of the search may be arranged by object identifier, manufacturer and other information such as nominal garment size. Information returned from the quer(ies) to database 150 concerning similar objects may then be used when accessing a vendor website 170—for example to order an article of clothing that is expect to be have a physical dimension as close as possible to the dimensions of the original object 120. The same information may be utilized when visiting brick-and-mortar clothing boutique 180 to, for example, ensure that a newly purchased garment from a different manufacturer is the same size as the original object garment 120.

Figure 2:
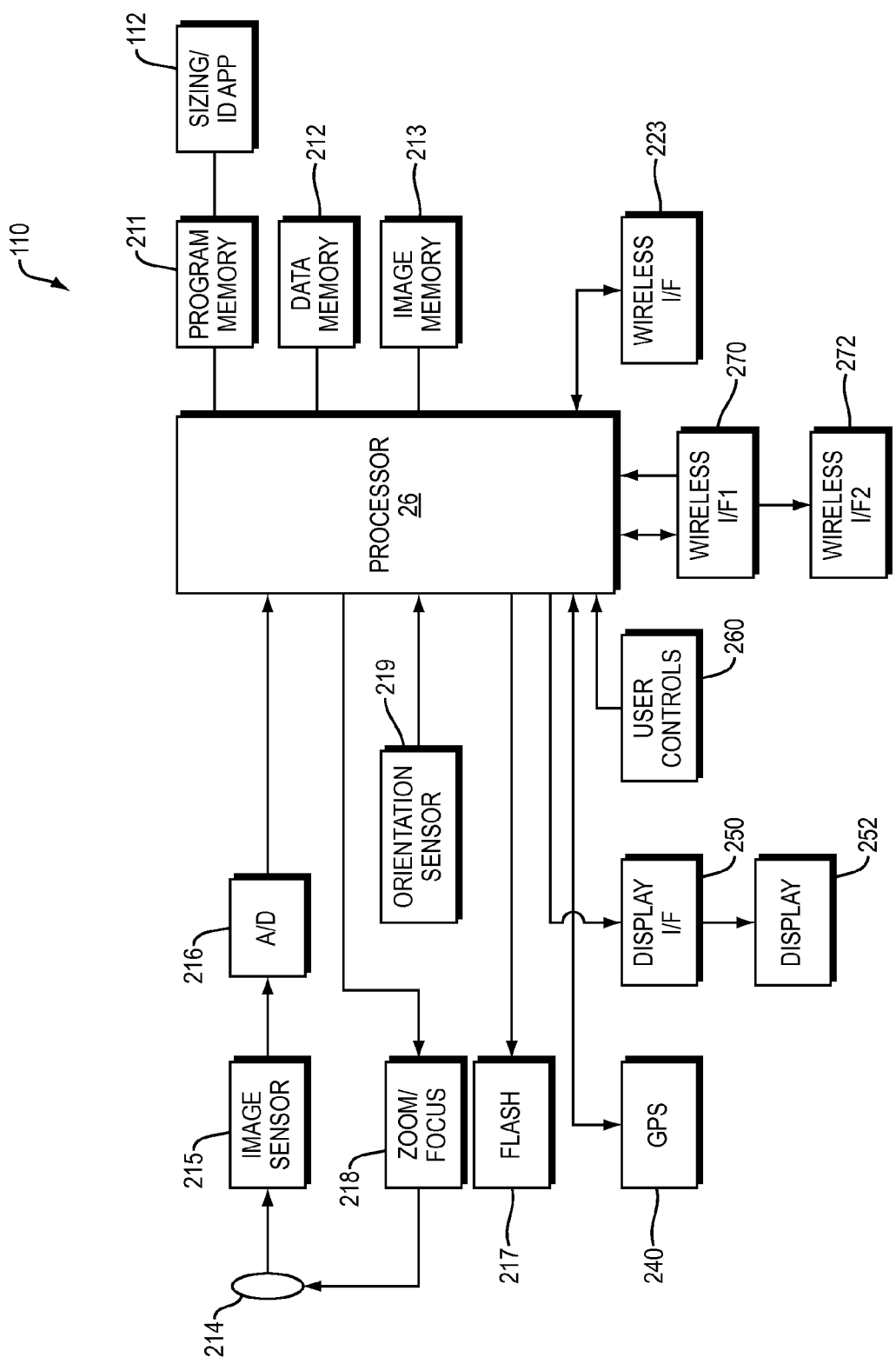
FIG. 2 is a more detailed view of the component of a typical mobile device.

FIG. 2 is a high-level diagram of the components of the mobile device 110. The mobile device may typically include a central processor 210 and associated program memory 211, data memory 212, and image memory 213, some or all of which may be permanent memory and some or all of which may be temporary/volatile memory. The object ID app 112 is resident in program memory 211. Components that permit capturing a digital image may include a lens 214, image sensor 215, and analog-to-digital converter 216. Devices that control the lens 214 and/or at further aspect of the captured image may include a zoom-focus control 218 and flash 217. An orientation sensor 219 may provide information concerning the relative position of the camera and/or mobile device 110 for use in image processing.

Other components such as a global positioning system (GPS) receiver 240, a display interface 250 and display 252, and user control (such as a keyboard) 260 are provided. Communication interfaces such as a first and second wireless interface 271, 272 and or wired 273 are also typically provided.

FIG. 3A is a high-level illustration of some of the types of information stored in and obtained from database 150. For example, the object templates 155 may include information representing the outline shapes of objects to be recognized by the app 112. In an example where the app is primarily concerned with recognizing garments of different types, the templates may include outlines of various garments such as women's slim fit jeans, women's comfort slacks, women's blouses, women's jackets, men's jeans, and/or other garment outlines. The templates may include a set of templates, with one template for each differently sized garment that is to be recognized as one example of a certain garment type.

FIG. 3B is an example representation of other types of information 158 in the database 150 such as a relational table of specific objects. Each object may have attributes such as a manufacturer or vendor name, a stock keeping unit, garment type, a nominal size, and measured dimensions specific to that object. So for example a specific object 310 may be a Mid-Rise Skinny Fit women's jeans product sold by Express™. The stock keeping unit (SKU) or other product identifying number is ABC23; and the nominal size for this garment is US women's size 8. The dimensions kept for this garment object 310 include an inseam, waist, hips, rise, and opening measurement specific to that particular manufacturer's jeans.

Also in the database 150 is another entry 312 for women's Tapered Leg Levi's 501 jeans with a product identifier of 1746. They have the same nominal size (US women's size 8) as the other object 310—however note that the inseam, waist, hips, rise and opening measurements are slightly different for this Tapered Leg Levi's 501 product than the Express Skinny Fit product.

It can also be noted that another women's jeans object 314 in the database is from Calvin Klein. This object only has a few of the dimensions associated with it—inseam, waist, hips and rise. Thus there even though objects of the same type it may not be possible to obtain the same set of dimensions for each such object from the manufacturer.

Other objects in the database 322 and 324 a pair of men's jeans and a women's blouse. Notably the nominal sizes for the men's jeans include a waist an inseam measurement only. Also note that the entry 324 for the blouse includes still other dimensions unique to that object type such as sleeve, chest, waist, hips, neck, and body length.

Turning attention now to FIG. 4A, in a first step of a process for identifying an object using the mobile app 112, a user selects an object of interest. In this example the object is a garment such as a pair of women's jeans. In a state 402 the user opens the app 112 on their mobile device 110. In step 403, the mobile app may present a user input prompt on the screen where the user may enter login information, their name, sex and/or other information particular to the user and to the purpose of the app 112.

Figure 5:
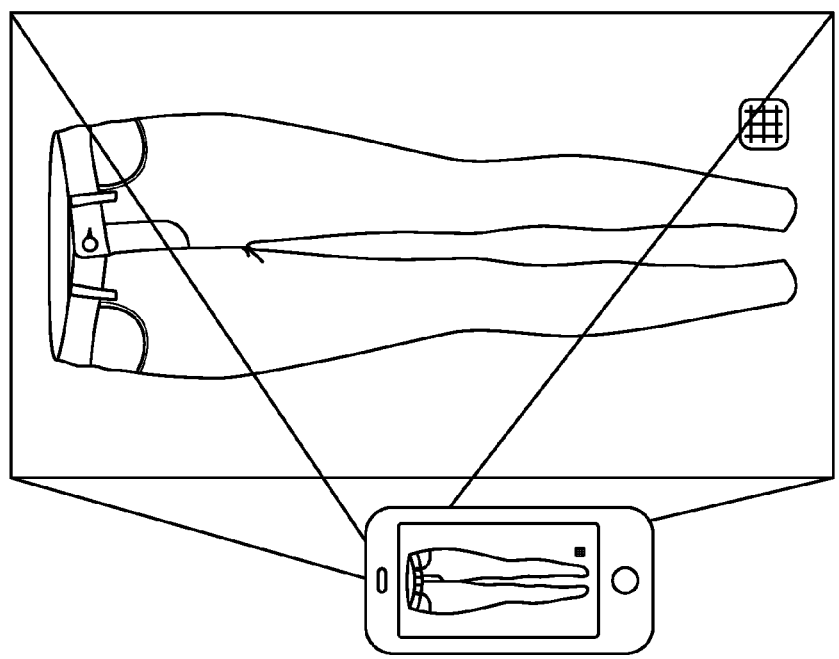
FIG. 5 shows an example of an object to be identified by typed and a reference item.
Figure 6:
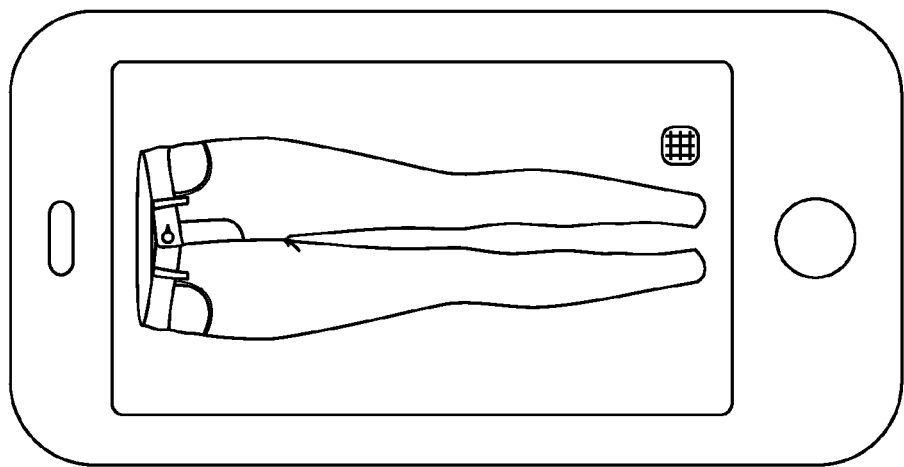
FIG. 6 is a view of the image taken of the object and reference.

Next in step 404 the user is prompted to take a picture of the garment object 120 with a reference object 130 located in the same frame. So for example as shown in FIG. 5 the user may lay out the garment 120 next to the reference object 130. In this example the reference object 130 is a credit card. The user then uses the mobile device 110 and snaps a digital photograph. In the example of FIG. 6 step 408 may display the image which will include both the object to be identified 120 and the reference object 130.

In step 409 the app 112 detects edges in the image to find an outline of the object 120 and reference 130. In a next series of steps (which may be optional) step 410 determines whether and of the object edges overlap. If they do overlap, then apparently the user has place the reference object 130 too close to the object 120. In step 411 the user may be prompted on the mobile device 110 to move the reference object 130 and retake the image, and then processing would return to state 409.

If however in step 410 there is no overlap between the edges the next step 412 may determine whether there are two and only two objects detected in the image as determined from the edge outlines. If this is not the case, then processing may proceed to step 413 where the app 112 displays another prompt informing the user that their picture is rejected and that they need to try again to take a shot of only a single object 120 and single reference 130.

Figure 4B:
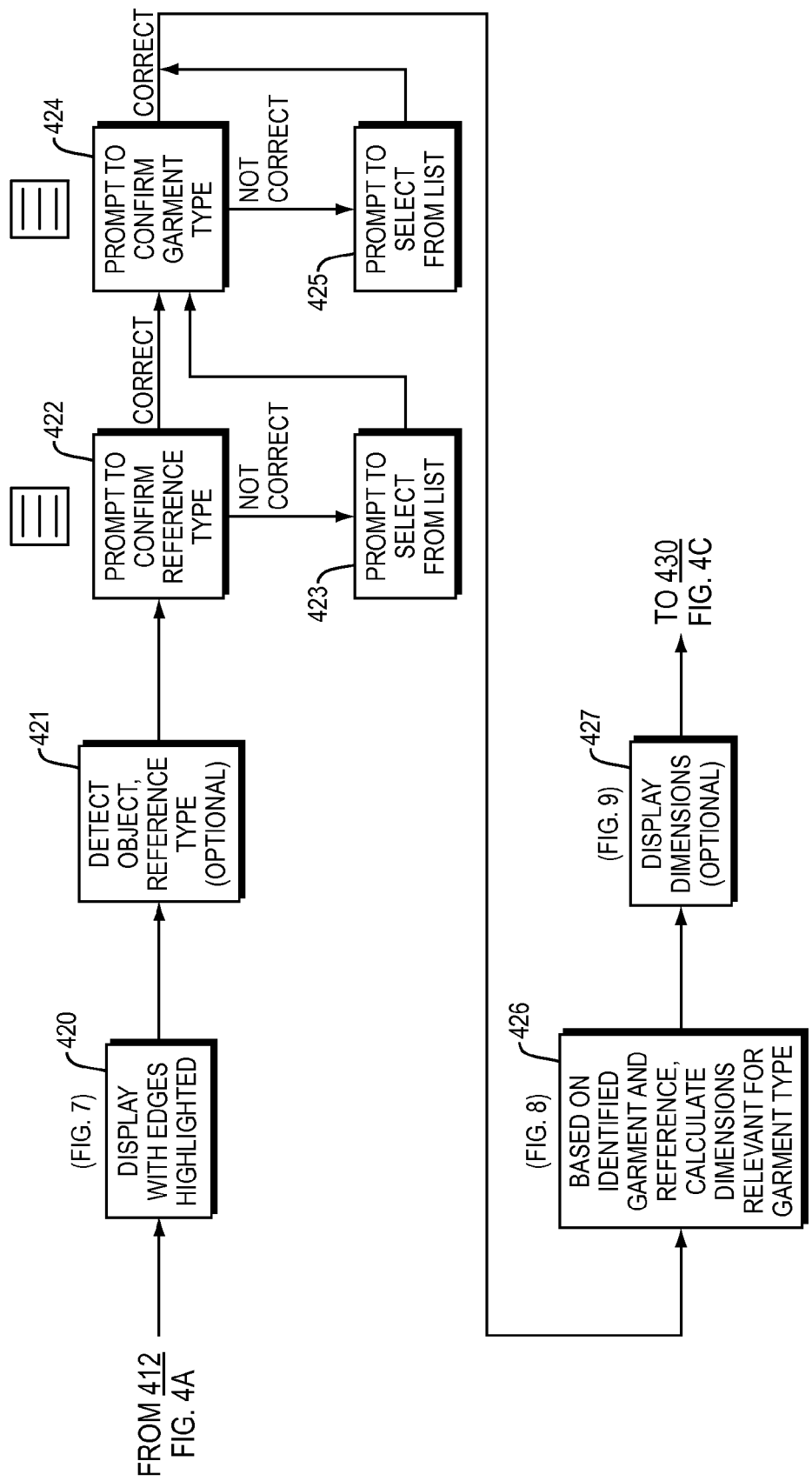
Figure 4C:
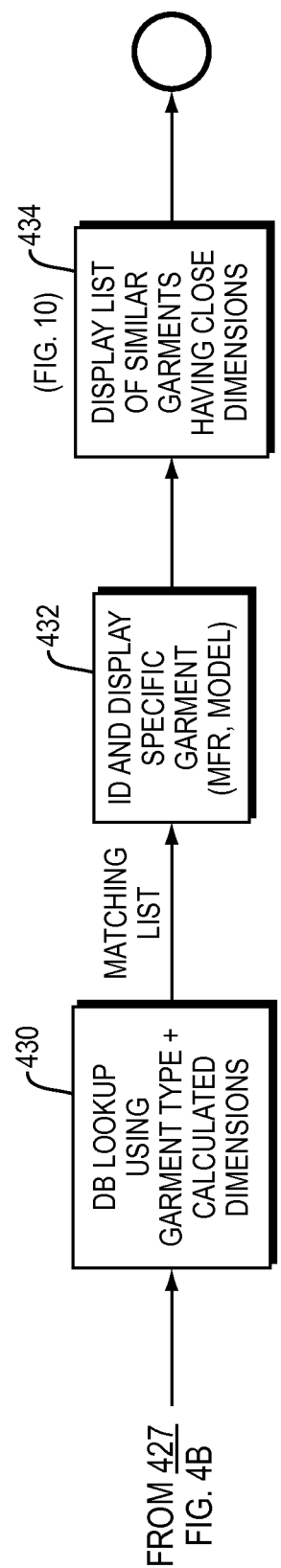
Figure 7:
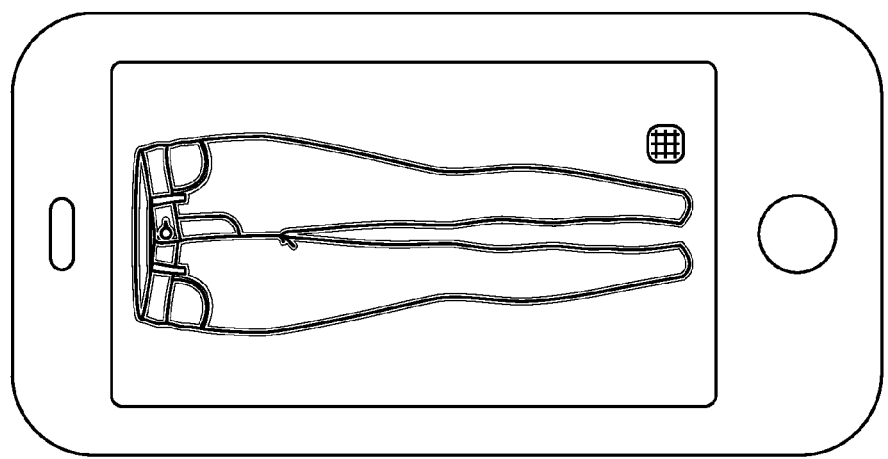
FIG. 7 is a view of image with edges of the object and reference highlighted.

In either event, now turning attention to FIG. 4B, the next step 420 may display the image with the detected outlined edges highlighted as in FIG. 7. Here the application has detected edges of the item to be measured 120 as well as the edges of the reference object 130.

The proportional dimensions of the edges of the detected object 120 and reference 130 in the image may then be used to determine dimensions of the object 120. The edges of the detected object 120 of interest may also be matched against object templates 155 to determine an object type in step 421. Based on the user's gender input and the garment outline, the garment outline may be resized and cross-referenced against a database of garment type templates.

More particularly, at this point (in step 421) the type of object 120 and type of reference 130 may have been detected through template matching, but the app 112 may enter a state 422 to confirm these types are each correct. Here in this optional step 422 the user is prompted to confirm the reference type. So here in this example the user may be asked to confirm that the reference object was correctly detected as a credit card. If this is not correct a state 423 may be entered where the user is prompted to select the correct reference object type from a list of possible reference object types.

Whether the reference 130 type was correctly determined automatically or via user prompts, a state 424 is next entered. In this state the user may be prompted to confirm the garment type was correctly detected (here a pair of women's jeans). If the detected garment type is not correct, then state 425 may present the user with a list of possible object types and ask them to manually select one.

Figure 8A:
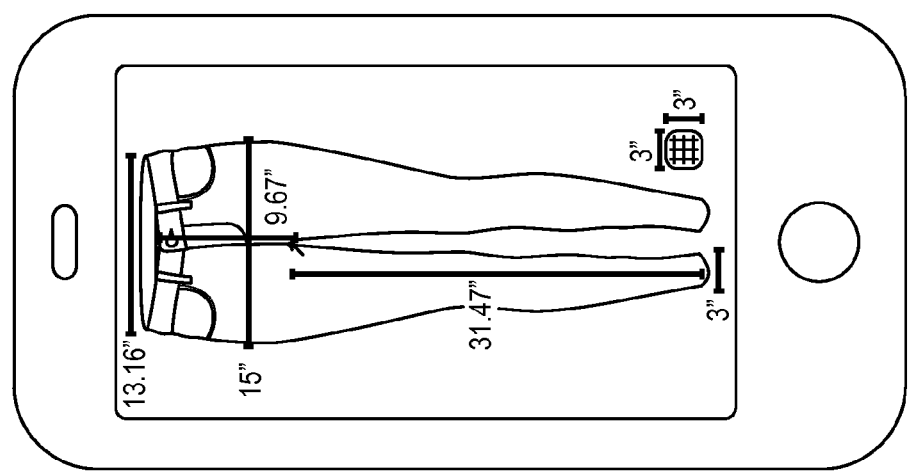
FIGS. 8A and 8B illustrate dimensions that may be calculated when the object is recognized as women's slacks or women's jacket, respectively.
Figure 8B:
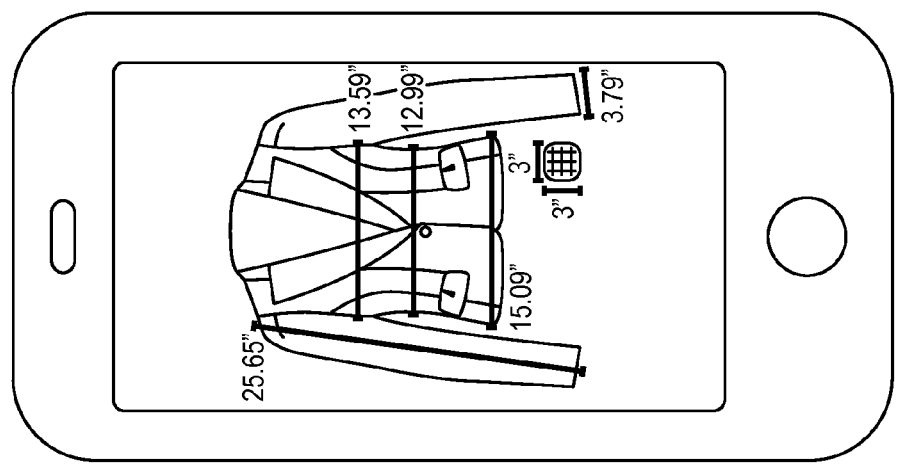

In any event state 426 is next entered where the dimensions of the object 130 may now be used. With reference to FIG. 8, and now having information concerning the identified garment type and the location of the edges of the garment and the reference object, the pixel dimensions of the item to be measured can be cross-referenced against a database of garment layouts based on the identified garment edges and corresponding measurement proportions. For example, an initial image processing step may only calculate a inseam length of the pair of jeans from a detected pixel width or pixel height of the reference item of known dimensions and by counting the pixel width or height of the corresponding edge in the image of the garment object 120.

In one example, this can be based on the pixel width ($x_r$) or pixel height ($y_r$) of the reference item 130 of known dimensions ($x_d$ and $y_d$) and the detected edges, the app 112 calculates the measurements ($m_w$ and $m_h$) of the object 120 by counting the pixel width ($x_a$) or height ($y_a$) between any set of edges of the object 120. Based on the garment type, this formula is applied to all necessary measurements to accurately identify the fit of the garment.

$x_{pr}$=pixel height of reference item $y_{pr}$=pixel width of reference item $x_d$=known height of reference item $y_d$=known width of reference item $x_{pa}$=pixel height of item to be measured $y_{pa}$=pixel width of item to be measured $m_h$=calculated height measurement $m_w$=calculated width measurement $$\text{Height Equation: } m_h = \frac{x_{pa}}{x_{pr}} * x_d$$

$$\text{Width Equation: } m_w = \frac{y_{pa}}{xy_{pr}} * y_d$$

Based on the garment identified in FIG. 7, the relevant edges are determined using background logic which may utilize a digital garment template with measurement points of interest that is resized to match the outer boundaries of the garment. The identified edges of the garment to be measured (using calculations in FIG. 8A) are compared to the template and edges closest matching to those in the garment template's identified edges. These edges are then used to calculate specific garment type measurements by scaling the corresponding values. The identified garment and dimensions are then displayed for the user.

Figure 9:
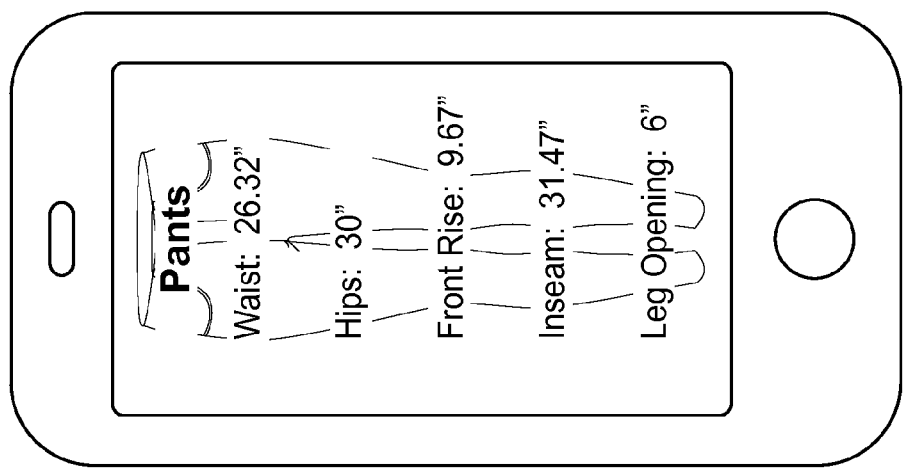
FIG. 9 shows an example display on the mobile device illustrating the calculated measurements.

More specifically, continuing with step 427 and with reference to FIG. 9, the calculated dimensions may now be displayed to the user on the screen of the mobile device 110. The calculated dimensions may be selected as those significant to the garment type detected. For example in an instance where the garment type detected is a pair of women's slacks, the dimensions displayed may include the waist, hips, front rise, inseam, and leg opening.

In a state 430 as an additional step, the garment type and calculated dimensions may then be submitted database 150 to identify further information concerning the detected garment and garments of the same type and similar size. The garments of the same type may include one or more different brands and/or retailers; the closest matching one may be returned as a further identification of the garment 120 for which the image was snapped. This information may be displayed in state 432 without all the detailed dimension information and as information more relevant to a user who is an end consumer. For example, the app 112 may simply display on the mobile device that the garment was detected as model such as "Express Mid-Rise Skinny Fit, Women's Size 8".

Figure 10A:
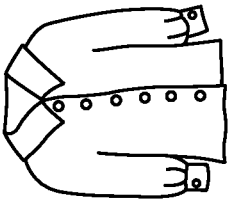
FIGS. 10A and 10B are an example display of the mobile device, having identified the particular object and a list of similar matching garments.

FIG. 10A is an example match result display when the garment 120 was a women's jacket, and the database search returned "Land's End Ruffle Placket Size 6" as the product with the smallest difference among all appropriate dimensions (sleeve, chest, waist, hips, neck, and body length).

In another state 434, a further list of multiple closely matching garments of the same type as the detected garment, but from other manufacturers/brands may be determined. In this step 434, the information concerning multiple matching garments may be returned. The list display may be sorted based upon the degree of match. The degree of match may be determined as a difference between measurements such as by the formula:

(user sleeve−mfr sleeve)+(user chest−mfr chest)+(user waist−mfr waist)+(user hips−mfr hips)+(user neck−mfr neck)+(user body length−mfr body length)

comparing the user's garment 120 against each of several possible manufacturer's jackets.

Figure 10B:
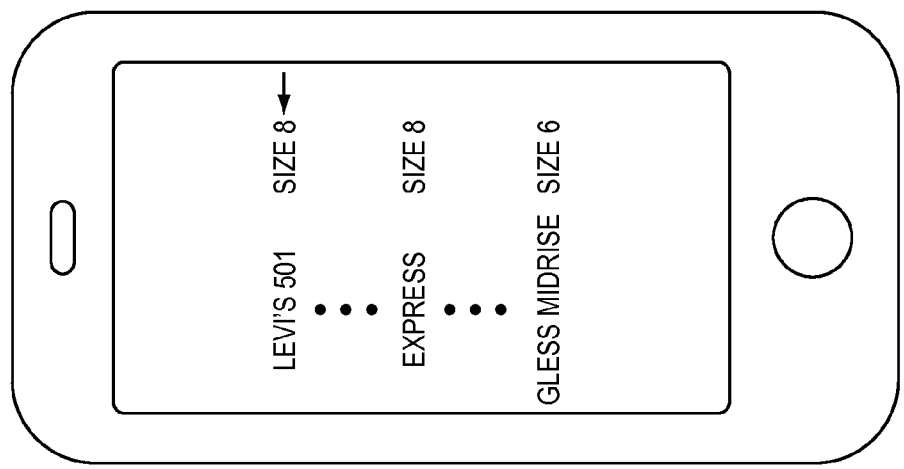

See FIG. 10B for an example such list.

The list of similar garments displayed in FIG. 10B may be sorted by previously defined user preferences. For example the user may previously entered data into app 112 to indicate a preference for Levi's 501™ jeans over Guess™ jeans.

The discussion of the system 100 now turns to further consideration for the other use cases mentioned previously.

Figure 11:
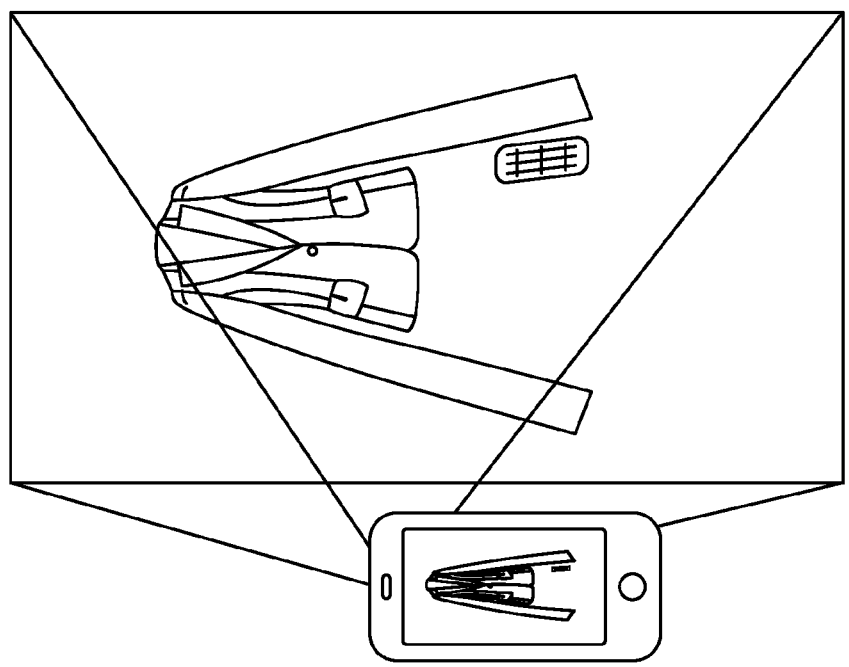
FIG. 11 illustrates what may happen when the mobile device introduces skew in the digital image.

FIG. 11 shows the use case "Example 2" situation where the user may not necessarily position the camera of the mobile device 110 perfectly perpendicular to a surface on which the garment 120 and reference object 130 are placed. This then results in skew to the image taken.

Figure 12:
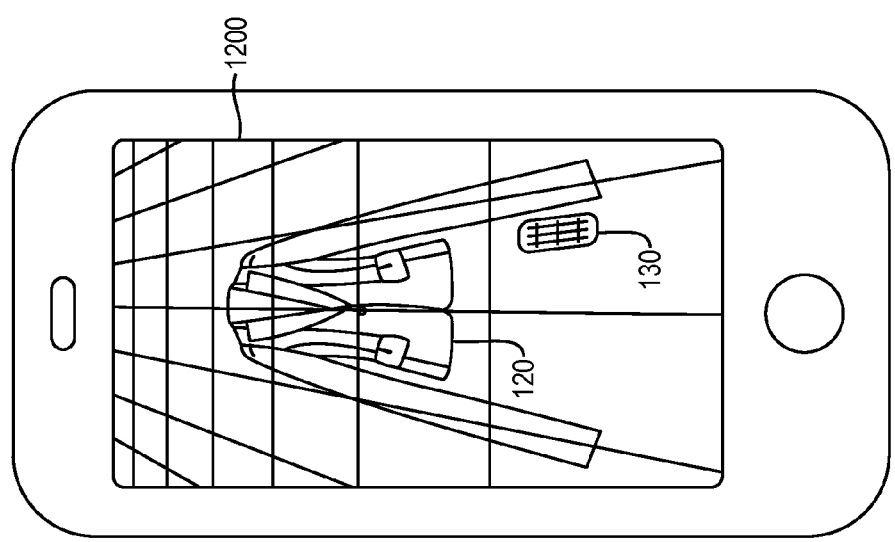
FIG. 12 shows a grid overlaid to match a detected distorted image.

FIG. 12 illustrates an optional step that can be added to the flow of FIG. 4A to correct this. In this optional step the app 112 may display the item to be measured and the reference item on the screen as before, but the image may be identified by the app 112 as being distorted based on recognition of the referenced object and detecting that the dimensions are disproportionate to a particular template object, or perhaps using information from the orientation sensor 219. A grid 1200 may be overlaid to match the garment skew automatically, or the grid may be manually manipulated by the user to match the skew of the rest of the digital image.

Figure 13:
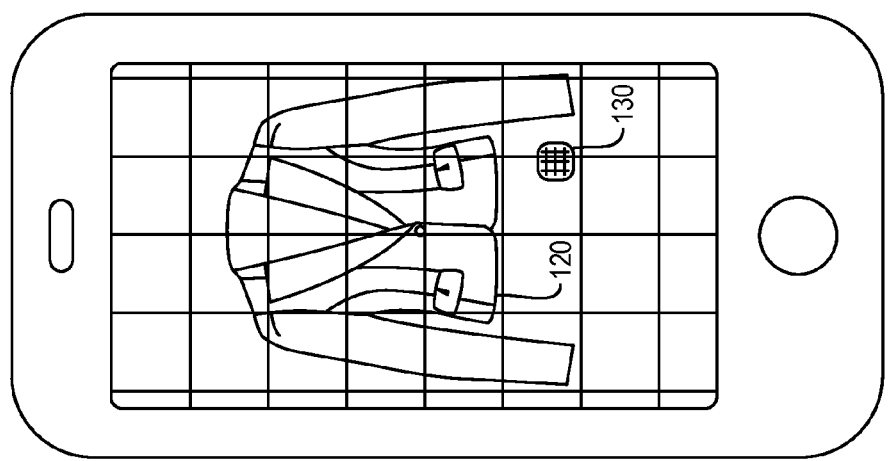
FIG. 13 illustrates a view presented when the mobile application de-skews the image.

As shown in FIG. 13 in a next step the app 112 de-skews the image based on the outer dimensions of the reference item and the overlaid grid. This may be accomplished in a method equivalent to the open source GIMP Image Manipulation software's Perspective Tool (http://gimp.soft32.com/) or Photoshop CS6 Perspective Crop Tool (http://www.photoshop.com/).

This de-skewing operation may be inserted as part of the detection of edges (Step 409 in FIG. 4A) but any event prior to step 420.

Figure 14:
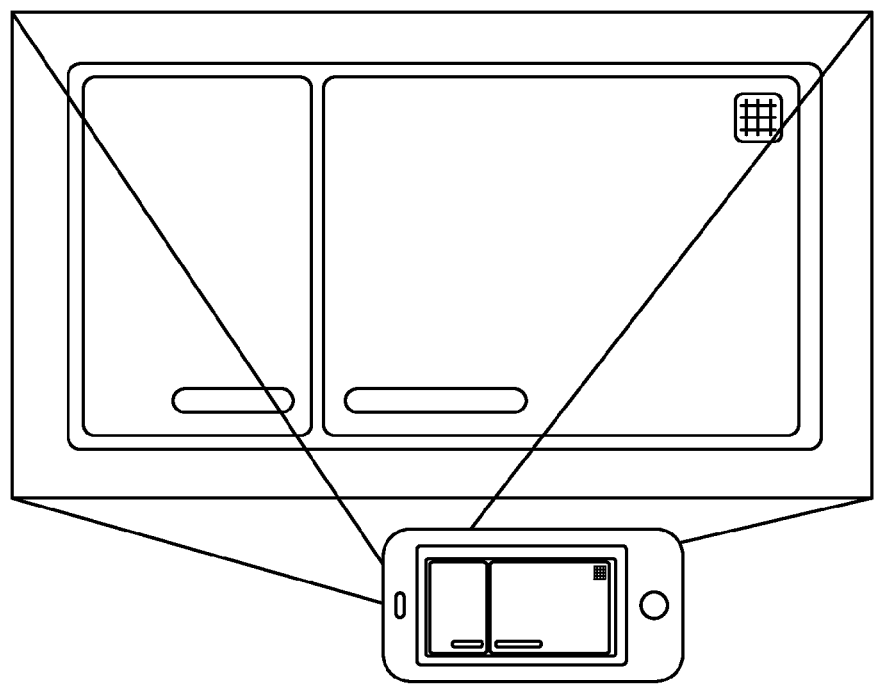
FIG. 14 shows the mobile app being uses to capture an image of another type of object.
Figure 15:
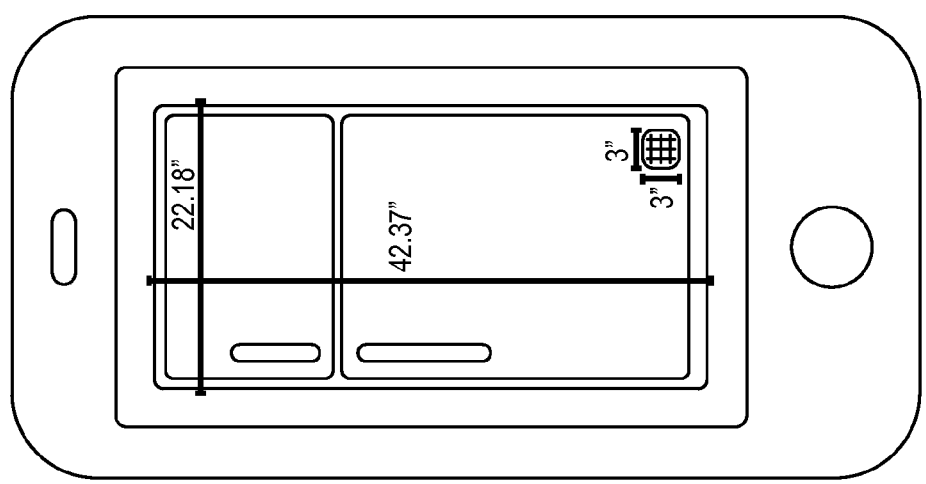
FIG. 15 shows the calculations that may be performed for the object of FIG. 14.

In another use case, "Example 3" described above, it was suggested that the app 112 could be used for detecting objects more generally. As shown in FIG. 14, the user may may wish to identify objects 1400 such as a refrigerator. There would again be a reference object 1410 positioned within the digital image. As shown in FIG. 15 the app 112 then proceeds to calculate dimensions of the reference object 120 and the refrigerator object. The only dimensions of interest may be a width and a height. In another example, the image processing software implemented in app 112 could possibly determined at depth as well using three-dimensional image processing algorithms.

It should be understood that the embodiments described above are but one example and the system and methods may be implemented in many different ways. In some instances, the various data processors and data processing described herein may each be implemented by a physical or virtual general purpose computer or smartphone device having a central processor, memory, disk or other mass storage, communication interface(s), input/output (I/O) device(s), displays, cameras, and other peripherals. The computer is transformed into the processors and executes the processes described above, for example, by loading software instructions into the processor, and then causing execution of the instructions to carry out the functions described. Embodiments may also typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace.

Furthermore, firmware, software, routines, or instructions may be described herein as performing certain actions and/or functions. However, it should be appreciated that such descriptions contained herein are merely for convenience and that such actions in fact result from computing devices, processors, controllers, or other physical or virtual elements executing the firmware, software, routines, instructions, etc.

Accordingly, further embodiments may also be implemented in a variety of computer architectures, physical machines, virtual machines, cloud services, and/or some combination thereof, and thus the computer systems described herein are intended for purposes of illustration only and not as a limitation of the embodiments.

Thus, while this invention has been particularly shown and described with references to example embodiments thereof, it will be understood by those skilled in the art that various changes in form and details may be made therein without departing from the scope of the invention as encompassed by the appended claims. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method executed in a digital processor for determining dimensions of an object comprising:

providing a digital photograph including a reference item and the object;

determining boundaries of the object and reference item from pixel data in the digital photograph;

retrieving dimensions for the reference item;

automatically calculating a first set of dimensions of the object using the object boundaries, the dimensions for the reference item, and the reference item boundaries, without interaction from the user;

determining an object type from the object boundaries;

from the object type determining a second set of dimensions relevant to the object type and different from the first set of dimensions;

further analyzing the object boundaries to calculate the second set of dimensions for the object; and from the first and second set of dimensions, determining further identifying information for the object including one of a manufacturer, retailer, brand name, model or stock number;

presenting the second set of dimensions and the further identifying information for the object on a display.

2. The method of claim 1 wherein the object type determined from the object boundaries is a garment including a pair of slacks, and the second set of dimensions includes at least two or more of waist, hips, front rise, inseam, and leg opening.

3. The method of claim 1 wherein the object type determined from the object boundaries is a garment including a blazer, and the second set of dimensions includes at least two or more of shoulder, bust, waist, hips, and sleeve.

4. The method of claim 1 further comprising:

presenting a user interface to accept a correction to distortion of the digital photograph.

5. The method of claim 1 further comprising:

prompting a user to confirm the object type prior to determining the second set of dimensions.

6. The method of claim 1 wherein the object type determined from the object boundaries is a garment, and the further identifying information is used to locate information related to one or more similar garments each having different identifying information.

7. The method of claim 6 wherein the further identifying information is a brand name, and the similar garments have different brand names than the object included in the digital photograph.

8. The method of claim 7 further comprising:

presenting a list of the similar garments to the user.

9. The method of claim 8 wherein the dimensions are provided for the similar garments, and the list of similar garments is ordered based on a degree of match of their respective dimensions to the second set of dimensions for the object included in the digital photograph.

* * * * *